UNITED STATES PATENT OFFICE.

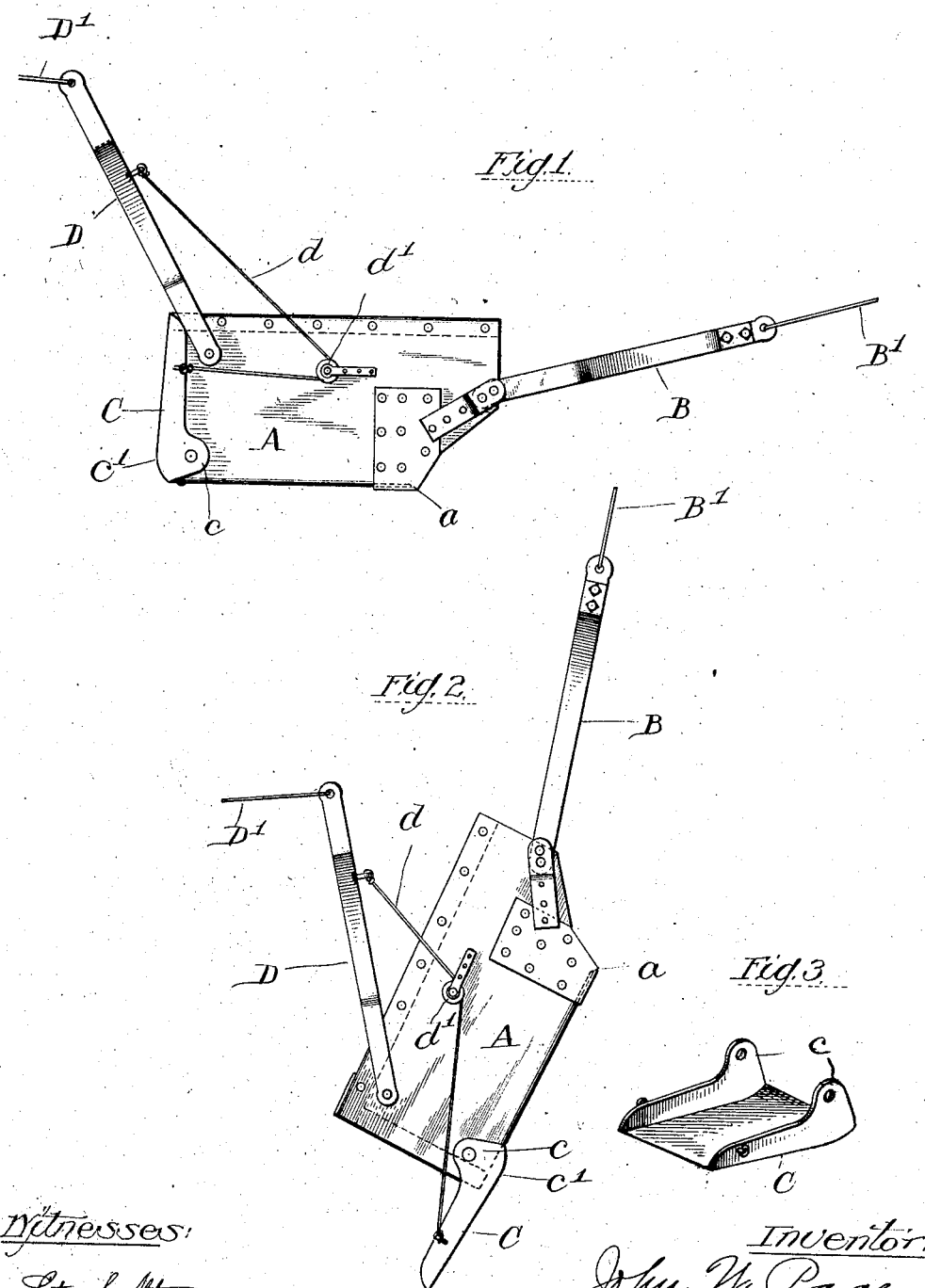

JOHN W. PAGE, OF CHICAGO, ILLINOIS.

EXCAVATING-SHOVEL.

No. 839,026.  Specification of Letters Patent.  Patented Dec. 18, 1906.

Application filed December 9, 1905. Serial No. 291,014.

*To all whom it may concern:*

Be it known that I, JOHN W. PAGE, a citizen of the United States of America, residing at Chicago, in the county of Cook and State of Illinois, have invented certain new and useful Improvements in Excavating-Shovels, of which the following is a specification.

My invention relates to improvements in excavating-shovels, and is fully described and explained in this specification, and shown in the accompanying drawings, in which—

Figure 1 is a side elevation of my improved shovel in the position in which it is normally used. Fig. 2 is a similar view showing the shovel in the dumping position, and Fig. 3 is a perspective view of the rear of the shovel removed.

Referring to the drawings, A is a shovel, preferably open at the top and front and having its lower front edge cut back to form a cutting edge $a$. A hauling-bail B is pivotally secured to the front of the shovel above and in front of the cutting edge, as and for the purpose set forth in my application for patent on excavating-shovels, filed on even date herewith and allotted Serial No. 291,013. This hauling-bail B is connected to a hauling-rope B', which in practice runs over a block on the free end of a derrick-boom, but which may be arranged in other ways, if desired.

The rear end of the shovel is closed by a tailpiece C, which has just above its lower edge two rearwardly-projecting ears $c$, which are pivoted to the sides of the shovel A. This tailpiece C is curved backward opposite the ears $c$, as illustrated at $c'$, so that it can be swung about its pivot upon the scoop from the position illustrated in Fig. 1 to the position illustrated in Fig. 2, the curve of the tailpiece enabling the edge thereof adjacent to the pivot to swing around the corner of the scoop and underneath the same, as illustrated. Pivotally secured to the scoop near its upper corner is a holding-bail D, which is connected by a rope $d$ with the tailpiece C near the upper end thereof, the said rope passing over a pulley $d'$ on the scoop. In practice two such ropes are provided, one on each side of the scoop, to give a symmetrical pull; but as the drawings are side elevations the second rope is not visible.

In the operation of my improved device the scoop is drawn along by the hauling-rope B' and fills itself with earth. The first earth which reaches the rear edge of the scoop strikes the tailpiece below its pivot and causes it to swing shut tightly, if it is not in this position already. During this filling movement of the scoop the holding-bail D is held backward by a holding-rope D', which in practice runs over a suitable drum. When the scoop is filled, it is lifted by the hauling-rope B' and transported to any desired position, the hauling-rope being kept taut to hold the contents of the scoop in place. When the shovel reaches a position where it is desired to deposit its contents, the holding-rope is released, permitting the tailpiece to swing down to dump the contents of the scoop.

A very desirable apparatus with which to use my scoop is an ordinary derrick, in which case the hauling-rope passes over the derrick-boom and the hauling-rope runs to a drum controlled by the hoisting-engine. The scoop will then run out nearly to the end of the boom, its own weight keeping it in contact with the ground. As it approaches the end of the boom, however, it will rise from the ground full of earth, and the boom can be swung up and around its pivot to a suitable dumping-point, where the holding-rope can be released. The boom can then be swung to its original position and the shovel drawn in by the holding-rope. The device can also be used on a trolley, if desired, or set up with a number of different devices.

I realize that considerable variation is possible in the details of this construction without departing from the spirit of the invention, and I therefore do not intend to limit myself to the specific form herein shown and described.

I claim as new and desire to secure by Letters Patent—

1. In a device of the class described, the combination with a shovel and hauling means at its forward end, of a tailpiece pivotally secured to the rear of the shovel and mechanism for holding the tailpiece in position to retain the contents of the shovel.

2. The combination with a shovel and hauling means secured to the front of the shovel, of a tailpiece pivoted between its ends above the lower edge of the shovel and means for holding the tailpiece in position to retain the contents of the shovel.

3. The combination with a shovel and hauling means secured to the front of the shovel, of a tailpiece pivotally secured to the rear of the shovel, a lever pivotally secured to the rear of the shovel, a holding-rope attached to the lever, a pulley on the shovel in front of the tailpiece and lever, and a flexible connection running from the lever to the tailpiece.

4. The combination with a shovel and hauling means secured to the front of the shovel, of a tailpiece pivotally secured to the rear of the shovel, a lever also pivotally secured to the rear of the shovel, a holding-rope connected to the lever, and means of connection between the lever and tailpiece whereby backward pull on the lever will hold the tailpiece shut.

In witness whereof I have signed the above application for Letters Patent, at Chicago, in the county of Cook and State of Illinois, this 5th day of December, A. D. 1905.

JOHN W. PAGE.

Witnesses:
CHAS. O. SHERVEY,
K. M. CORNWALL.